M. C. KRARUP.
VEHICLE SPRING.
APPLICATION FILED JAN. 27, 1913.
1,137,145.
Patented Apr. 27, 1915.
2 SHEETS—SHEET 2.
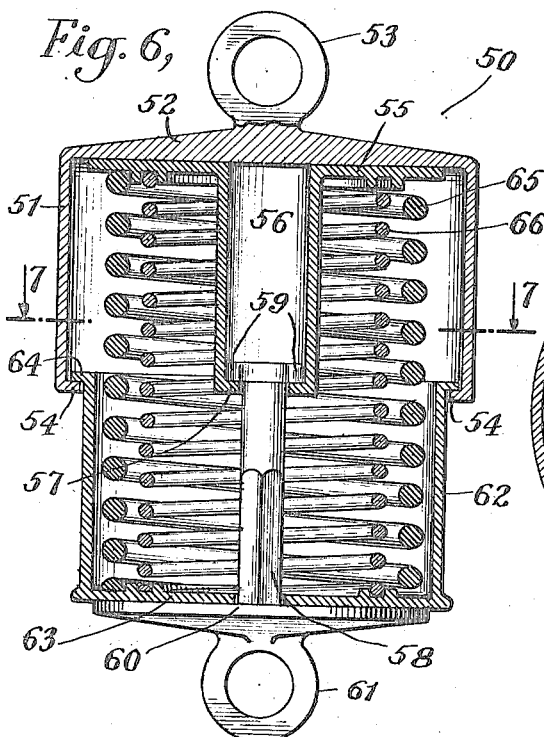
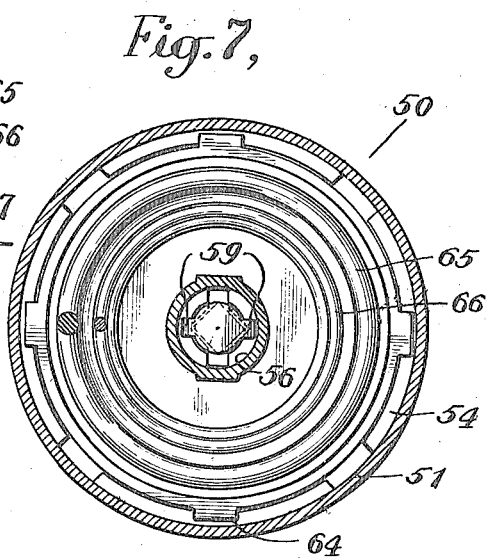
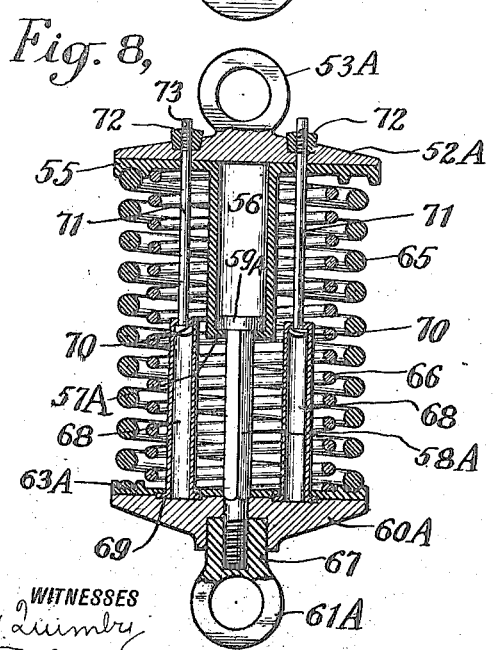
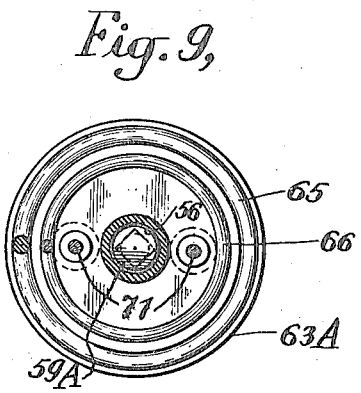
WITNESSES
INVENTOR
ATTORNEY

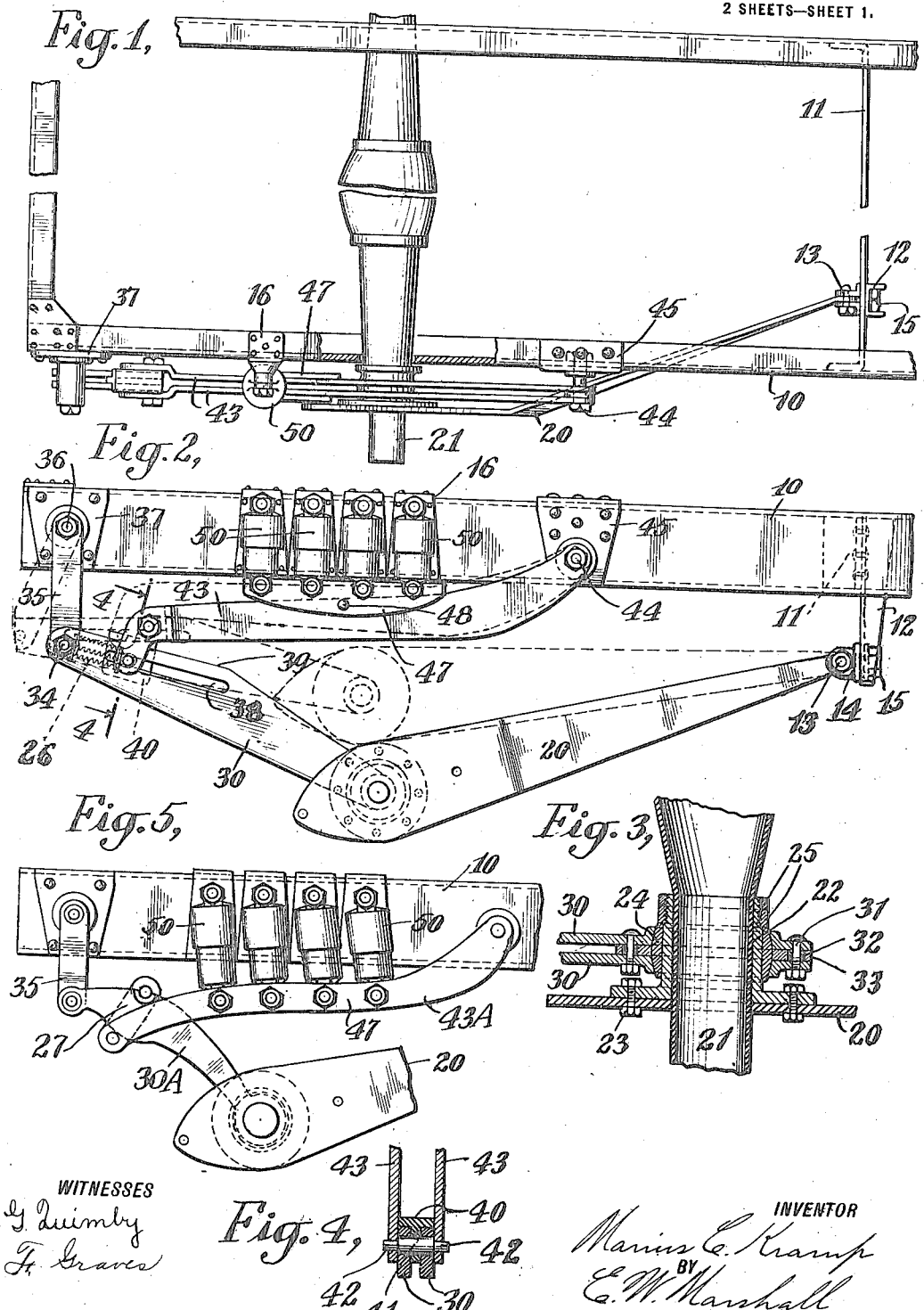

UNITED STATES PATENT OFFICE.

MARIUS C. KRARUP, OF NEW YORK, N. Y.

VEHICLE-SPRING.

1,137,145. Specification of Letters Patent. Patented Apr. 27, 1915.

Application filed January 27, 1913. Serial No. 744,333.

*To all whom it may concern:*

Be it known that I, MARIUS C. KRARUP, a citizen of the United States, and a resident of the city, county, and State of New York, have invented certain new and useful Improvements in Vehicle-Springs, of which the following is a specification, reference being had to the accompanying drawings, forming a part thereof.

My invention relates to improvements in vehicle springs and especially to a spring suspension which is applicable to motor trucks and the like and its object is to provide a simple device of this character by means of which the effect of the spring is varied by changes in load so that the proper resiliency is provided for the vehicle when it is empty or loaded.

Other objects of the invention will appear in the following specification in which the invention will be described, the novel features of which I will set forth in appended claims.

Referring to the drawings, Figure 1 is a plan view of an apparatus which embodies my invention and of enough of the body of a vehicle illustrated to show how the device is applied thereto. Fig. 2 is a side elevation of the device shown in Fig. 1. In Fig. 3 is a plan view of a portion of the axle of the vehicle with certain of the parts of my novel mechanism shown in section. A detail of construction is shown in Fig. 4 which is a transverse section on the line 4—4 of Fig. 2. A modified form of construction is shown in side elevation in Fig. 5. Fig. 6 is a sectional elevation and Fig. 7 a sectional plan view, both on an enlarged scale, of one of the compression spring elements which are shown in some of the preceding figures. The section in Fig. 7 is taken on the line 7—7 of Fig. 6. A modified form of spring element is shown in Figs. 8 and 9 in sectional elevation and sectional plan view respectively.

Like characters of reference designate corresponding parts in all the figures.

10 designates the frame of a vehicle such as a motor truck, to which the device is applied.

11 is a transverse member affixed to and forming a part of this frame. On it are rigidly supported a pair of brackets such as 12 on which are supported the radius rods such as 20. The connection between each bracket and its respective radius rod is made by a bolt 13 passing through the radius rod near its end and through two parallel ears of a member 14 which has a cylindrical spindle which passes through the bracket 12 and is held thereon by a nut 15. This construction provides a pivotal support for the radius rod which allows it to swing up and down and to rotate in a plane at right angles to the pin 13.

The vehicles axle 21 passes through the radius rod and is connected therewith by some such arrangement as that shown in Fig. 3 in which 22 is a flanged collar on the axle and 23 are bolts affixing the radius rod to the flange thereof. This arrangement permits the axle to move up and down relatively to the frame of the vehicle and also allows one end of the axle to move up without corresponding movement of its other end or with an opposite movement of its other end. A collar 24 having a spherically curved outer surface is held upon the flanged collar 22 by nuts 25. The ends of a pair of flat parallel connecting bars 30 are cupped to surround this collar 24. These bars are connected together by bolts 31 passing through metallic spacing washers 32 and between them may be inserted a larger washer 33 of felt or the like. Thus the connecting bars are pivotally connected with the axle and with the radius rod and are also allowed a limited amount of swinging movement at right angles to the axis of the axle. A bolt 34 passes through the connecting bars near their other ends and through a link 35, the other end of which is pivotally supported at 36 on a bracket 37 affixed to the vehicle frame 10. The link 35 holds the bars 30 the required distance apart.

In the bars 30 are slots 38 which are at an angle to the line connecting the pivotal points near the ends of the bars and are parallel with the part 39 of the upper edges of these bars. Between the bars is a slidable block 40 of T-shaped cross section, the upper flanges of which ride upon the surfaces 39. 41 is a cylindrical member which fits in a hole in block 40 and from the ends of which project trunnion-like pins 42 which extend through the slots 38 and through the ends of a pair of suspension bars 43 outside of connecting bars 30. This forms a slidable pivotal connection between one end of the suspension bars 43 and a part of the connecting bars intermediate its pivotally supported ends. The slots 38 may be curved instead of straight and it is not essential that the edges 39 be parallel to the slots unless they are to assist in guiding the block 40 as in the arrangement shown in the drawings. In fact the block may be omitted entirely but is preferably used in order to relieve the pivot pins 42 and the slots from excessive wear. The other ends of the suspension bars are pivotally supported at 44 in a bracket 45 affixed to frame 10 at a point between the transverse member 11 and the bracket 37.

47 is an equalizer bar pivotally connected with the suspension bars at 48. To it are connected the ends of compression spring elements 50, the other ends of which are connected with brackets 16 on the frame 10. Four of these are shown in Fig. 2 but in Fig. 1 only one is shown, the others being omitted from this figure for the sake of clearness.

Referring now to Figs. 6 and 7, I will describe the construction of one form of these compression spring elements. In these figures, 51 is a hollow cylindrical casing provided with a head 52 from which centrally extends a ring 53. From the other end of this casing an interrupted flange 54 projects inwardly. Against the inner surface of the head 52 is the circular flange 55 of an inner member from the center of which depends a hollow cylindrical post 56. 57 is an interrupted flange which projects inwardly from the lower end of this post. 58 is a spindle which projects into the post 56 and has lugs 59 extending from its diametrically opposite sides over the flange 57. The lower end of this spindle is of square cross section. On the other end of this spindle is a circular head 60 from which centrally extends a ring 61. 62 is another hollow cylindrical casing on one end of which is a head 63 in the center of which is a hole through which the spindle 58 passes freely. From the upper edges of this casing projects outwardly an interrupted flange 64. Helical compression springs 65 and 66 of different sizes of wire and preferably of opposite pitch, are placed between the flange 55 and the head 63 both of which may be provided as shown, with annular shoulders for maintaining the springs in axial alinement. The flanges 54 and 64 are interrupted so that one may be passed within the other when one of the casings is rotated a quarter of a revolution relatively to the other. Then when turned back again into the positions shown in the drawings they lock the casings 51 and 62 together. Similarly the lugs 59 may be passed by the interrupted portions of flange 57 when turned at right angles to the position in which the spindle is shown in the drawings. When pins or holding bolts are passed through the rings 53 and 61 the parts cannot rotate relatively and therefore cannot come apart. When pressure is applied at the rings 53, 61 to force them together, it is obvious that the springs 65, 66 are compressed. It may be seen that when pressure is applied at the rings 53, 61 to force them apart, the springs will also be compressed. Thus the springs are never subjected to tensional strains which so readily changes or destroys their resiliency.

In the modification shown in Figs. 8 and 9 the same result is obtained. In this case the ring 53ᴬ is on a plate or disk 52ᴬ under which is the member which comprises the flange 55 and the hollow cylindrical post 56 with an inturned flange 57ᴬ. Into this post extends a spindle 58ᴬ provided with a head 59ᴬ which engage the flange 57ᴬ. This spindle is of square cross section through a portion of its length, but its lower end is round and threaded into a shackle 67, which forms the ring 61ᴬ. This shackle is seated in a counter-sunk hole in the center of a circular head or disk 60ᴬ.

63ᴬ is a disk in the center of which is a square hole through which the spindle 58ᴬ passes freely. At either side of this hole are others through which are inserted tubes 68, 68 the lower ends of which are flanged outwardly as at 69 and the upper ends of which have inwardly extending flanges 70. Bolts 71 pass through these tubes and through the disk 52ᴬ. The heads of these bolts are under the flanges 70 and on their other ends are nuts 72 which if desired may be seated in recesses in the upper surface of the disk 52ᴬ to prevent them from turning or they may be held in place by pins 73. Between the flange 55 and the disk 63ᴬ are interposed the compression springs 65, 66. This form of spring element is to be used in substantially the same way as that shown in Figs. 6 and 7 is used and operates in substantially the same manner.

Referring now to Figs. 1 and 2 and before specifically describing the modification illustrated in Fig. 5, I will point out the operation of my invention. It is obvious that the weight of the vehicle frame 10 is sustained by the axle 21 through the spring elements 50 and the leverage system shown and described. When there is no load upon the vehicle the parts may assume the relative positions in which they are shown in full lines in Fig. 2. It may be seen that the pressure upon the spring elements is exerted by them upon the axle at a certain distance therefrom. This may be so designed as to give the desired sensitiveness to the spring action to cause the light vehicle to ride easily.

When the pressure between the vehicle frame and its axle is increased by a sudden jar or by placing a load upon the vehicle, the increased pressure will cause the vehicle frame and the axle to approach each other, that is the parts will tend to assume the relative positions in which they are shown in dotted lines in Fig. 2. Now the spring elements exert the pressure which is transmitted through them, at a shorter distance from the axle because of the slidable connection between the ends of the suspension bars 43 and the connecting bars 30. In other words the leverage is automatically changed by variations in load on the vehicle. With a load on the vehicle, the spring elements are not only compressed to a greater extent, but their pressure becomes applied at a point which is more effective to resist jars. Thus a vehicle with this apparatus applied is provided with a spring which is effective with wide variations in load. By this means the riding qualities of a vehicle are rendered independent of the load carried by it within the limits for which the vehicle is designed and are very materially improved for light loads. It is furthermore possible to provide the same spring apparatus for a one ton truck and for a six ton truck, instead of providing an entire different spring mechanism for each as has heretofore been necessary.

The bars 20, 30 and 43 are made of flat steel of such composition and temper as to combine toughness under all circumstances with perfect resiliency after moderate deflections, and effectively cushion all side strains. The connections are such that no undue mechanical strains can come upon the mechanism. If there is a tendency for the sliding block 40 to return too slowly to its initial position, this may be counteracted by placing a tension spring 26 between it and the bolt 34.

The number of spring elements may be varied with different trucks, or with the same truck when it is to be used for different kinds of traffic. They are so made that they effectively resist tensional as well as compression strains without any tensional strains on the helical springs themselves.

There are several elements which enter into the resultant variation in effective spring pressure on the axle, each of which may be more or less adjusted and predetermined in order that the vehicle may be best adapted to carry the loads for which it is intended. For example, each of the slots 38 may be arranged parallel to a line connecting the two pivotal points near the respective ends of the bars 30 and the point 34 may be arranged to move only in a substantially horizontal direction. In this case the effective spring pressure will depend directly upon the difference in the lever arms as the axle moves toward and from the vehicle body and the end of the suspension bar is pivoted at a different intermediate position in the bars 30. By arranging the slot at an angle to the line of the bar as shown in Fig. 2. the leverage effect is increased. The inclination and shape of the slot may obviously be varied to suit anticipated load conditions.

The fact that the point 34, instead of moving horizontally, swings around the pivot 36 and is consequently raised toward the vehicle body, serves as an additional element to increase the spring pressure more rapidly as the axle approaches the vehicle body. This element may readily be adjusted and predetermined by varying either the initial inclination of the link 35 or its length.

Of course there need be but one spring element 50 between the vehicle frame and the suspension bar, in which case there is no need of an equalizer bar such as 47. It is also apparent that even with a plurality of compression spring elements, the equalizer bar may be omitted and the lower ends of these elements connected directly with the suspension bars. Such an arrangement is illustrated in Fig. 5 in which the suspension bar 43$^A$ and connecting bars 30$^A$ are of somewhat different shape than those previously described and in which they are connected together by a link 27 instead of a slidable connection. This spring arrangement has certain advantages over the arrangement of Fig. 2 because it is possible to secure a wide adjustment of the resultant spring action by suitably setting the initial compression of each spring. The operation of this form of my invention is similar to that before described.

It is feasible to use any of the well known forms of shock absorbers in conjunction with the mechanism herein described and it is also well within the scope of this invention to use air cushions as the resilient members of the apparatus.

It is obvious that the resilient members sustain the varying pressures between the vehicle frame and the axle whether such pressures be positive and actual or negative and in the form of tensional strains. Although the form of resilient member which I use becomes compressed when subjected to either pressure or tension the expression in the claims "pressures between the frame and axle" is intended to be construed to cover negative pressures or tensional strains.

What I claim is:

1. A vehicle frame, an axle therefor, a resilient member at a fixed point on said frame arranged to sustain pressures between the frame and axle, a bar on which said member acts, said bar being supported on the frame and arranged to be moved automatically relative to the resilient member in a plane at right angles to the direction of the resiliency of said member by the relative movement of the axle toward and from the frame.

2. A vehicle frame, an axle therefor, a resilient member at a fixed point on said frame arranged to sustain pressures between the frame and axle, a bar on which said member acts and a swinging support for the bar arranged to give said bar a longitudinal movement relative to the resilient member.

3. A vehicle frame, an axle therefor, a compression spring element at a fixed point on said frame arranged to sustain pressures between the frame and axle, and a bar on which said element acts, said bar being supported on the frame and arranged to be moved automatically longitudinally relative to said element by the relative movement of the axle toward and from the frame.

4. A vehicle frame, an axle therefor, a resilient member at a fixed point on said frame arranged to sustain pressures between the frame and axle, a connecting bar, a suspension bar pivoted at one end to the vehicle frame, a movable connection between the other end of the suspension bar and said connecting bar, said resilient member being interposed between the vehicle frame and the suspension bar and means for moving the connecting bar longitudinally in relation to the suspension bar.

5. A vehicle frame, an axle therefor, a resilient member at a fixed point on said frame arranged to sustain pressures between the frame and axle, a connecting bar, a suspension bar pivoted at one end to the vehicle frame, a movable connection between the other end of the suspension bar and said connecting bar, said resilient member being interposed between the vehicle frame and the suspension bar intermediate the ends of the suspension bar and a swinging support for the connecting bar whereby its position is shifted automatically in a longitudinal direction in relation to the suspension bar.

6. A vehicle frame, an axle therefor, a plurality of resilient members arranged to sustain pressures between the frame and the axle, a bar on which said members act, means for automatically shifting the relative positions of the resilient members and the bar, and means for equalizing the pressures upon said members.

7. A vehicle frame, an axle therefor, a plurality of resilient members at fixed points on said frame arranged to sustain pressures between the frame and axle, a bar on which said members act in a substantially vertical direction, said bar being supported on the vehicle frame to have a longitudinal movement in a substantially horizontal direction and means for equalizing the pressures upon said members.

8. A vehicle frame, an axle therefor, a plurality of resilient members at fixed points on said frame arranged to sustain pressures between the frame and axle, a connecting bar, a suspension bar pivoted at one end to the vehicle frame, a movable connection between the other end of the suspension bar and said connecting bar, an equalizing bar connected with the suspension bar, said resilient members being connected with said equalizing bar, and means for moving the connecting bar longitudinally in relation to the suspension bar.

9. A vehicle frame, an axle therefor, a plurality of resilient members at fixed points on said frame arranged to sustain pressures between the frame and axle, a connecting bar, a suspension bar pivoted at one end to the vehicle frame, a movable connection between the other end of the suspension bar and said connecting bar, an equalizing bar pivotally connected with the suspension bar intermediate the ends of said suspension bar, said resilient members being connected with the equalizing bar, and a swinging support for the connecting bar whereby its position is shifted automatically in a longitudinal direction in relation to the suspension bar.

10. A vehicle frame, an axle therefor, a radius rod pivoted to the frame and supported by the axle, a connecting bar connected at one end with the radius rod and swingingly connected at its other end with said frame, and a resilient member at a fixed point on the frame having a movable connection with the connecting bar.

11. A vehicle frame, an axle therefor, a radius rod pivoted to the frame and supporting the axle, the support for said rod being provided with means for permitting a turning movement thereof in a direction at right angles to its movement about its pivot, a connecting bar connected at one end with the radius rod and swingingly connected at its other end with said frame, and a resilient member at a fixed point on the frame having a movable connection with the connecting bar.

12. A vehicle frame, an axle therefor, a radius rod pivoted to the frame and supporting the axle, a connecting bar connected at one end with the radius rod and swingingly connected at its other end with said frame, a suspension bar pivoted at one end to the vehicle frame, a movable connection between the other end of the suspension bar and said connecting bar, and a resilient member interposed between the vehicle frame and said suspension bar.

13. A vehicle frame, an axle therefor, a radius rod pivoted to the frame and supporting the axle, a connecting bar connected at one end with the radius rod and swingingly connected at its other end with said frame, a suspension bar pivoted at one end to the vehicle frame, a movable connection between the other end of the suspension bar and said connecting bar, a plurality of resilient members interposed between the vehicle frame and said suspension bar, and means for equalizing the pressures upon said members.

14. A vehicle frame, an axle therefor, a radius rod pivoted to the frame and supporting the axle, a connecting bar connected at one end with the radius rod and swingingly connected at its other end with said frame, a suspension bar pivoted at one end to the vehicle frame, a block slidably supported on said connecting bar, a connection between the other end of the suspension bar and said block, and a compression spring element connected with the suspension bar intermediate its ends and with the vehicle frame.

15. A vehicle frame, an axle therefor, a radius rod pivoted to the frame and supporting the axle, a connecting bar connected at one end with the radius rod and swingingly connected at its other end with said frame, a suspension bar pivoted at one end to the vehicle frame, a block slidably supported on said connecting bar, a connection between the other end of the suspension bar and said block, a compensating bar pivotally mounted upon the suspension bar intermediate its ends, and a plurality of compression spring elements connected with the vehicle frame and said compensating bar.

16. A vehicle frame, an axle therefor, interconnected levers between the frame and its axle, and a resilient member arranged to sustain pressures between the frame and its axle, said levers being arranged to automatically change their relative positions to thereby shift the point of action of the resilient member, said levers being constructed of flat spring metal and adapted to cushion side strains between the vehicle frame and its axle.

17. A vehicle frame, an axle therefor, a resilient member at a fixed point on said frame, arranged to sustain pressures between the frame and axle, a bar on which said member acts, said bar being supported on the frame to have a movement relative to the resilient member in a plane at right angles to the direction of its resiliency, said bar being constructed of flat spring metal and adapted to cushion side strains between the vehicle frame and its axle.

18. A vehicle frame, an axle therefor, a resilient member at a fixed point on said frame arranged to sustain pressures between the frame and axle, a connecting bar, a suspension bar pivoted at one end to the vehicle frame, a movable connection between the other end of the suspension bar and said connecting bar, said resilient member being interposed between the vehicle frame and the suspension bar, and means for moving the connecting bar longitudinally in relation to the suspension bar, said bars being constructed of flat spring metal and adapted to cushion side strains between the vehicle frame and its axle.

19. A vehicle frame, an axle therefor, a radius rod pivoted to the frame and supporting the axle, a connecting bar connected at one end with the radius rod and swingingly connected at its other end with said frame, and a resilient member at a fixed point on the frame having a movable connection with the connecting bar, said radius rod and bars being constructed of flat spring metal and adapted to cushion side strains between the vehicle frame and its axle.

20. A vehicle frame, an axle therefor, a radius rod pivoted to the frame and supporting the axle, the supports for said rod being provided with means for permitting a turning movement thereof in a direction at right angles to its movement about its pivot, a connecting bar connected at one end with the radius rod and swingingly connected at its other end with said frame, and a resilient member at a fixed point on the frame having a movable connection with the connecting bar, said radius rod and bars being constructed of flat spring metal and adapted to cushion side strains between the vehicle frame and its axle.

21. A vehicle frame, an axle therefor, a radius rod pivoted to the frame and supporting the axle, a connecting bar connected at one end with the radius rod and swingingly connected at its other end with said frame, a suspension bar pivoted at one end to the vehicle frame, a block slidably supported on said connecting bar, a connection between the other end of the suspension bar and said block, a compensating bar pivotally mounted upon the suspension bar intermediate its ends, and a plurality of compression spring elements connected with the vehicle frame and said compensating bar, said radius rod, connecting bar and suspension bar being constructed of flat spring metal and adapted to cushion side strains between the vehicle frame and its axle.

22. A vehicle frame, an axle therefor, a resilient member between the frame and the axle, and a slidable connection adapted to be moved at right angles to the direction of resiliency of said element by the relative movement of the axle toward and away from the frame, said connection by its movement being arranged to vary the effect of the resilient element.

23. A vehicle frame, an axle therefor, a resilient element at a fixed point on said frame arranged to be compressed by relative movements of the frame and axle toward or from each other, a connecting bar, a compression bar pivoted at one end of the vehicle frame, a movable connection between the other end of the suspension bar and said connecting bar, said resilient element being interposed between the vehicle frame and the suspension bar intermediate the ends of the suspension bar and a swinging support for the connecting bar whereby its position is shifted automatically in a longitudinal direction in relation to the suspension bar.

24. A vehicle frame, an axle therefor, a plurality of compression spring elements at fixed points on said frame arranged to be compressed by relative movements between the frame and axle, a connecting bar, a suspension bar pivoted at one end to the vehicle frame, a movable connection between the other end of the suspension bar and said connecting bar, an equalizing bar connected with the suspension bar, said compression spring elements being connected with said equalizing bar, and means for moving the connecting bar longitudinally in relation to the suspension bar.

25. A vehicle frame, an axle therefor, a resilient member, a bar on which said member acts in a substantially vertical direction and means dependent upon relative movements of the frame and axle toward and away from each other for automatically shifting the relative positions of the resilient member and the bar in a substantially horizontal direction.

26. A vehicle frame, an axle therefor, a resilient element at a fixed point on said frame, a bar on which said element acts, said bar being supported on the frame and arranged to be moved automatically relative to the resilient element at right angles to the direction of its resiliency by relative movements of the frame and axle toward and from each other.

27. A vehicle frame, an axle therefor, a compression spring element at a fixed point on said frame, a bar on which said element acts, said bar being supported on the frame and arranged to be moved automatically longitudinally relative to said element by relative movements of the frame and axle toward and from each other.

28. A vehicle frame, an axle therefor, a plurality of resilient elements, a bar on which said elements act, means dependent upon a relative movement of the frame and axle toward or from each other for automatically shifting the relative positions of the resilient elements and the bar and means for equalizing the pressures upon said elements.

In testimony whereof I have hereunto set my hand in the presence of two subscribing witnesses, this 25 day of January, 1913.

MARIUS C. KRARUP.

Witnesses:
F. GRAVES,
B. J. DEARBORN.